Feb. 3, 1970 H. R. WARD 3,493,898

WIDEBAND PHASE SHIFTER

Filed April 1, 1968 3 Sheets-Sheet 1

INVENTOR
HAROLD R. WARD
BY Edgar O. Rost
ATTORNEY

INVENTOR
HAROLD R. WARD
BY Edgar O. Rost
ATTORNEY

INVENTOR
HAROLD R. WARD
BY Edgar O. Rost
ATTORNEY

United States Patent Office 3,493,898
Patented Feb. 3, 1970

3,493,898
WIDEBAND PHASE SHIFTER

Harold R. Ward, Bedford, Mass., assignor to Raytheon Company, Lexington, Mass., a corporation of Delaware Filed Apr. 1, 1968, Ser. No. 717,777
Int. Cl. H01p *1/18*
U.S. Cl. 333—11 6 Claims

ABSTRACT OF THE DISCLOSURE

A passive transmission network for providing a constant phase shift over a wide bandwidth in the radio frequency spectrum of from primarily intermediate to ultra high frequencies. Hybrid transmission line type devices together with time delay line means contribute to the processing of signal pulses by dividing and recombination to yield separate signals having substantially equal group delay but varying by 90° in carrier signal phase. The output signals are summed in a final combiner means which provides freedom to vary both amplitude and phase of the output signals.

The invention herein described was made in the course of, or under a contract or subcontract thereunder, with the Department of the Army.

BACKGROUND OF THE INVENTION

In radio frequency transmission networks, particularly in receiver circuits before amplification, wide bandwidth is of paramount importance. The area of interest under consideration in the present invention extends to the portion of the frequency spectrum between 2 and 200 megahertz. In this frequency range lumped constant components and conventional transmission line techniques may be utilized.

The term "hybrid" as employed in the description of the present invention shall be interpreted to encompass any transmission component which splits single signals into multiple outputs or combines multiple signals into a single output with substantially no interference between the respective input and output lines. A device such as a hybrid transformer or, as it is also referred to, a hybrid coil is an ideal example as applied to telephone communications. Such devices generally have three or four winding repeat coils arranged so that incoming and outgoing currents in a two wire transmission line are substantially isolated from each other. Hybrid structures of interest combining the properties of transmission lines with transformers having ferrite cores can be employed in the practice of the present invention and have been described in an article entitled "Some Broad-Band Transformers" by C. L. Ruthroff, in the Proceedings, of the IRE, August 1959, pps. 1337–1342. Additionally, an article of interest entitled "Transmission Line Pulse Transformers" by Richard E. Matick may be found in the Proceedings of the IEEE, vol. 56, No. 1, January 1968, pps. 47–62, describing further useful components.

In radio frequency networks at the frequencies under consideration many applications arise where it is desirable to process signal inputs into output signals having constant phase shift characteristics. One area of interest resides in the monopulse receivers for the processing of radar information signals wherein it is of utmost importance to compensate for phase errors between the sum and difference signals through the use of a wideband intermediate frequency phase shifter.

SUMMARY OF THE INVENTION

In accordance with the teachings of the present invention a radio frequency transmission network is provided for the processing of input signal pulses utilizing a plurality of power dividing means together with power recombining means to produce a desired output signal. A first portion of the circuit provides for the resolution of an input signal into two signals of equal group delay; however, with a phase difference of 90° in the carrier signal. Resistive splitters as well as hybrid components are within the scope of the invention. The second circuit provides for the combination of these signals together with variable gain in the sum and difference arms to produce a variable amplitude signal having the desired phase shift. Each of the pulses in the first circuit is provided with three time delays between each of the signal splitting hybrid means to achieve the equal envelope delay with the carrier phase signals 90° apart. Additionally, the disclosed phase shifter achieves its wide bandwidth in part through the use of attenuators coupled in discrete portions of the circuit network.

BRIEF DESCRIPTION OF THE DRAWINGS

The invention, as well as the specific details of the construction of a preferred embodiment, will now be described, reference being directed to the accompanying drawings in which.

DESCRIPTION OF THE PREFERRED EMBODIMENT

Figure 1:
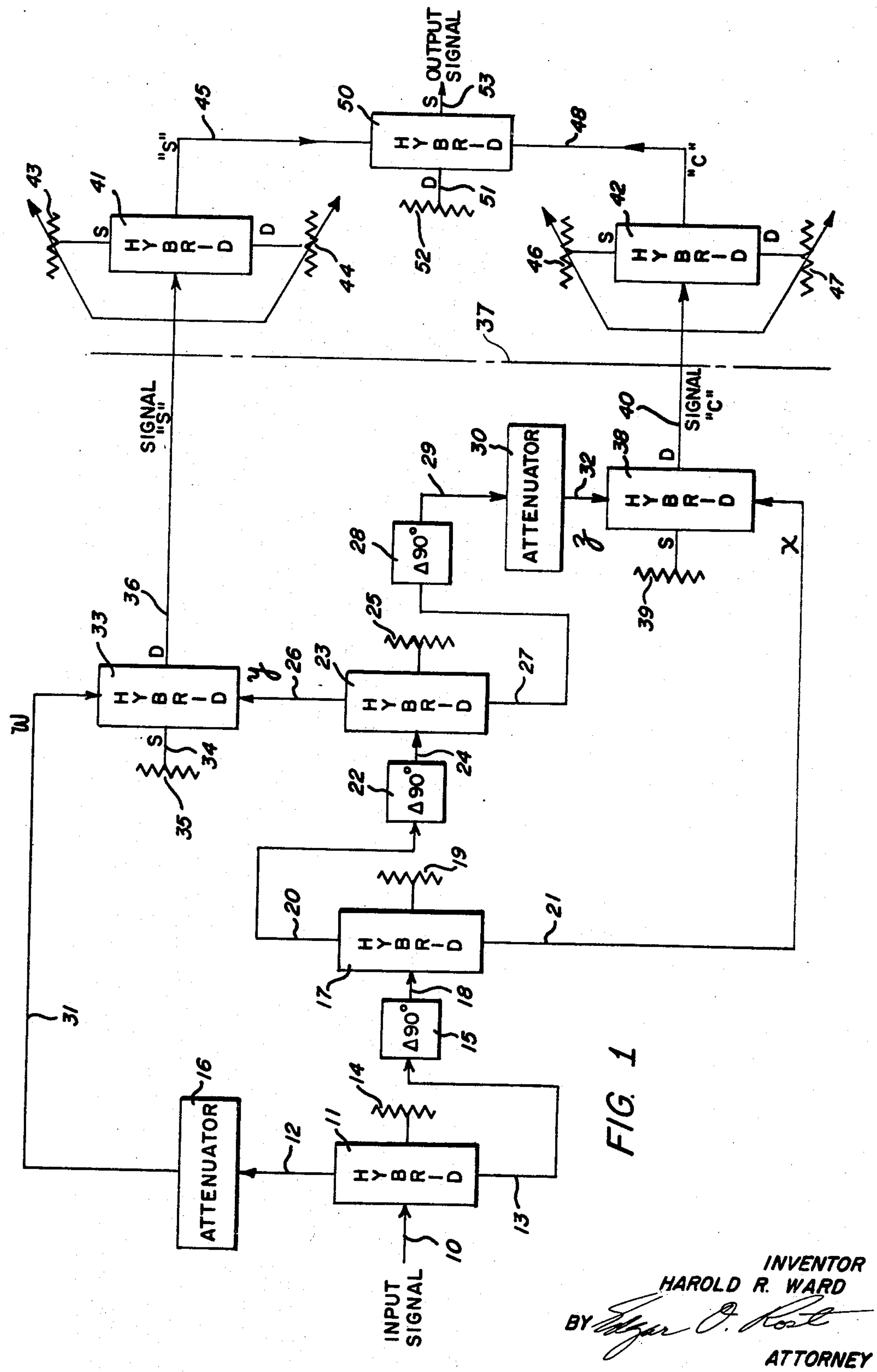
FIG. 1 is a schematic circuit diagram of the illustrative embodiment of the invention.

Referring now to the drawings and in particular FIG. 1, a new and novel circuit is disclosed for providing over a wideband a signal with a 90° phase difference in the carrier signals while the group delay remains substantially equal. An input signal is fed into the circuit through conventional transmission line means 10 and may be in the intermediate frequency range of approximately 2–200 megahertz. Such a signal may be derived from a single source such as an antenna in a monopulse radar system. This signal pulse provides the input to a hybrid 11 which provides for the substantially equal splitting of the signal along two branch lines 12 and 13 as well as a matched impedance load 14. The lines in the disclosed circuit may be of the two wire transmission type or comprise a conventional coaxial line having an inner and outer conductor. Branch line 13 is connected to the first of a plurality of signal time delay line means designated by the numeral 15. Each of the delay line means in the embodiment have an electrical length to provide a 90° phase shift at the center frequency $f_0$ of the input signals. Ideally a length of coaxial cable transmission line may be employed for the time delay line means.

The other branch 12 is serially connected to attenuator means 16 which assists in the achievement of the wide bandwidth of the over-all network. For a 40 percent bandwidth in the range of frequencies under consideration (from 2 to 200 mHz.) an attenuator having a value of approximately 15.54 decibels was utilized.

The delayed output of substantially one-half of the input signal power 10 is fed to the second hybrid splitter 17 by means of line 18. A matched load 19 is provided at one branch of the hybrid to maintain the isolation of the outputs. Again, the input signal is split and transmitted by branch lines 20 and 21. Line 20 is connected to the second time delay line means 22, also having a predetermined 90° phase shift at the center frequency of the applicable voltage pulses.

The third hybrid splitter 23 is coupled by line 24 to the delay line means 22. This hybrid member is also provided with matched load 25 and the split signals are fed by means of lines 26 and 27 to subsequent circuit components. Line 27 is connected to the third time delay line means 28 which is in turn connected by line 29 to an attenuator 30. In the illustrative embodimet for a 40 percent bandwidth in the frequency range of 2–200 mHz. attenuator 30 had a value of approximately 6.54 db.

The original incident signal which has been split but not delayed is attenuated by attenuator means 16 and transmitted by means of line 31 to the hybrid structure now to be described. Additionally, the attenuated thrice delayed signal leaving attenuator 30 by means of line 32 is connected to a similar structure. The second type of hybrid means which should be of the 180° type may comprise a hybrid transformer for combining two input signals to achieve a sum and difference signal. Such hybrids may be conveniently referred to as 180° hybrid combiners. The first of this second type of hybrid is designated 33 with two 180° oriented inputs connected to, respectively, lines 31 and 26 from earlier described portions of the circuit. The remaining two branches of hybrid member 33 are connected by a line 34 to matched load 35 and the output or difference of the two input signals is coupled by means of line 36 to the second circuit which is disposed to the right of an imaginary plane defined by the line 37. A similar hybrid combiner 38 has two inputs connected by lines 21 and 32 together with a load 39 and an output line 40. The circuit disposed to the left of the line 37 provides for two signals of substantially equal group delay together with a variation of 90° in the phase of the carrier signals. The hybrid combiners, then, take the difference of their respective dual inputs and the combined signals are designated by the letters S and C. To the right of the line 37 these signals S and C are summed and combined with variable gain to produce the desired phase shift and the amplitude is also variable.

Another pair of 180° hybrid members 41 and 42 are connected to the lines 36 and 40, respectively. Each of these hybrids are provided with variable mismatches on the sum and difference arms to provide for the variable amplitude signal at the isolated outputs. Hybrid 41 is provided with variable mismatches 43 and 44 and the output signal is connected to the line 45. Similarly, hybrid 42 is provided with variable mismatches 46 and 47 and the output signal is coupled through line 48.

The respective signals S and C together with the desider variable gain to produce the desired phase shift are combined in a final hybrid summing member 50 which is similar to the previously described hybrids 33 and 38 with the exception of the connections to the respective branch arms. Two inputs fed by lines 45 and 48 are introduced at points 180° apart. The difference line 51 is connected to the matching load 52 and the combined isolated summed output signal is fed by line 53 to the utilization circuitry.

Figure 2:
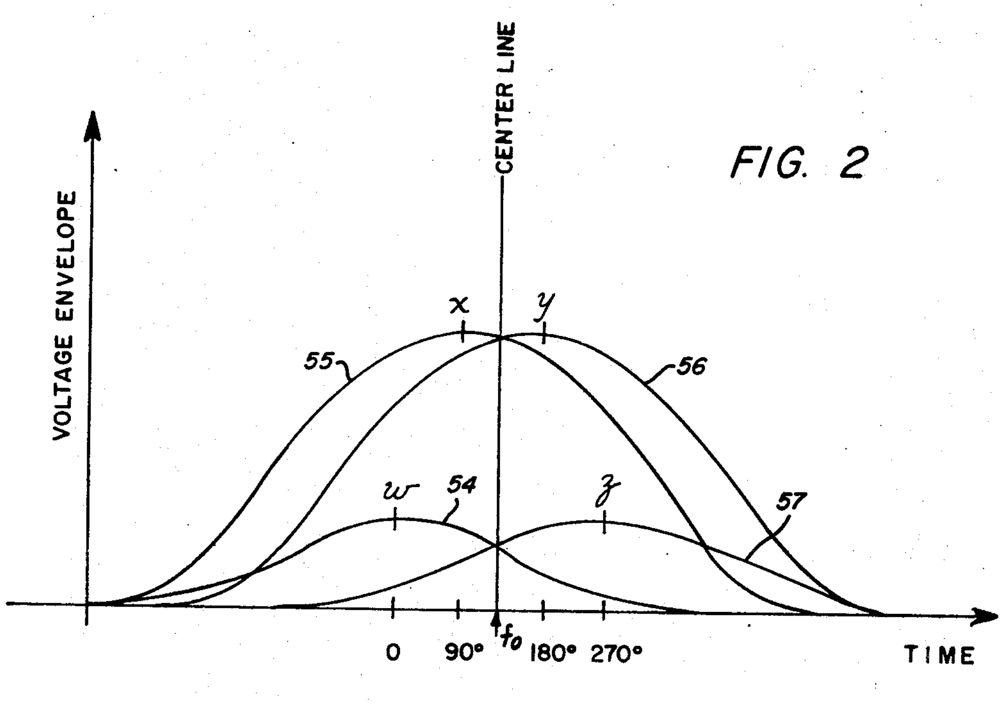
FIG. 2 is a diagrammatic representation of the pulse envelope generated in portions of the over-all circuit of the invention.

To provide a clear understanding of the disclosed embodiment of the invention its operation will now be described, reference being directed to FIGS. 2 and 3. In FIG. 2 the relative size and time position of a pulse envelope as it propagates through the circuit is shown. The four positions at which the pulse envelope will be considered are designated $x$ and $y$ which have the desired 90° phase shift between them but a different group delay while the pulses $w$ and $z$ are subtracted from these pulses to equalize the group delay. The pulse $w$ is subtracted from $y$ and the pulse at $z$ is subtracted from the pulse at $x$ to provide the two output signals S and C having the aforementioned characteristics.

The method of combining the pulses having the desired characteristics will now be described in connection with the first circuit of the embodiment of the invention. An incoming signal pulse fed into the network through line 10 is split by hybrid 11 into substantially equal signals which are transmitted via lines 12 and 13 to subsequent components. The one-half signal traversing line 12 may be desirably attenuated by the attenuator means 16 having, illustratively, a value of 15.54 db. This signal then passes along the line 31 connected to the sum and difference type of hybrid combiner designated by the numeral 33 and is represented by the letter $w$. The pulse envelope for the attenuated signal $w$ is shown by curve 54 in FIG. 2. The time variable characteristic is plotted along the horizontal coordinate line and since this signal pulse experiences no delay a zero phase shift is indicated. The remaining one-half portion of the input signal is transmitted via line 13 to the time delay means 15 providing a 90° phase delay at the center of the frequency band $f_0$. This delayed pulse is fed to hybrid 17 where again a split into equal signals is provided. One-half of the signal is fed by line 21 and comprises an input signal designated by the letter $x$ into hybrid 38. This signal $x$ has experienced one delay and is represented by the pulse envelope curve 55 in FIG. 2. It will be noted from the pulse envelope for the attenuated $w$ pulse that the voltage level differs from the pulse envelope for the $x$ signal pulse.

The second portion of the signal fed into hybrid 17 is transmitted via line 20 to the second 90° time delay means 22 from whence the delayed signal is transmitted via line 24 to the third and final hybrid splitter 23. Again as in the previous hybrid the signal is split and one-half is fed by line 26 to the second class or sum and difference type of hybrid combiner to provide the second input signal designated $y$. Referring to FIG. 2 curve 56 indicates the pulse envelope for the signal $y$ and it will be noted that this signal has substantially the same amplitude as the signal $x$; however, a 90° phase difference exists between the two signals. The signal $y$ which was originally one-half of the signal $x$ has now experienced two 90° delays and is therefore 180° out-of-phase at the carrier frequency.

The remaining one-half of the signals transmitted through hybrid 23 experience another 90° time delay through delay line 28 and are transmitted through line 29 to an attenuator 30. Attenuator means 30 may, illustratively, have a value of 6.54 db. when operating in the frequencies under consideration. The attenuated signal designated by the letter $z$ now is resolved into a second input into the hybrid combiner 38. This signal $z$, curve 57 in FIG. 2, which was originally one-half of signal $y$ has experienced three time delays and is therefore substantially 270° out-of-phase at the carrier frequency. It will be noted that signal $z$ by reason of the attenuation has an amplitude substantially equal to that of the earlier nondelayed signal $w$.

The four respective pulse envelopes which have the desired phase shift and group delay characteristics are now desirably combined to equalize the group delay and provide a 90° phase difference in the carrier signal frequencies. In hybrid 33 signal $w$ is combined with signal $y$ and the difference of the two inputs is resolved as an isolated output S through line 36. Signal $w$ which has no delay when combined with signal $y$ will have a combined pulse peak at the center line.

In a like manner the higher amplitude signal $x$ which has been delayed 90° is combined with the lower amplitude signal $z$ which has been delayed by 270° and the difference output signal having a peak pulse at 135° is fed by line 40 to subsequent circuitry as an output C signal. The two output signals therefore emanating from the circuitry to the left of the imaginary line 37 or as it is referred to the first circuit of the phase shifter network has provided for pulses whose carrier frequencies are 90° out-of-phase and have an equal group delay.

Figure 3:
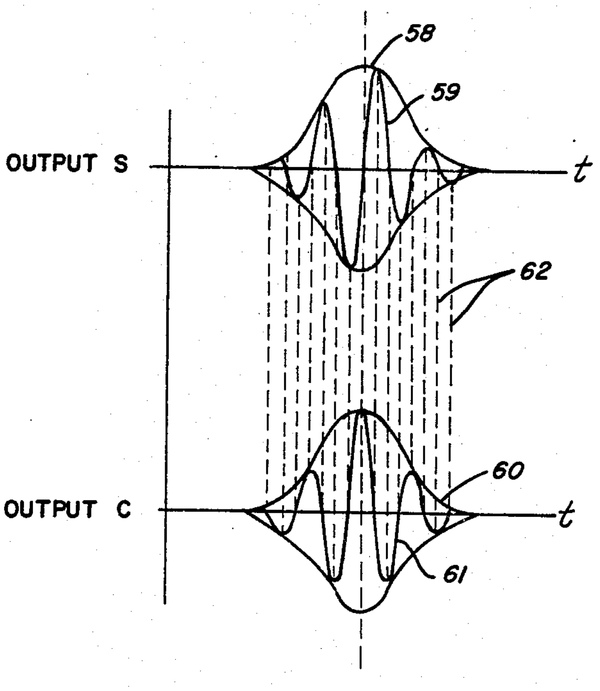
FIG. 3 is a diagrammatic representation of the group amplitude modulated pulse envelopes together with carrier signals generated at a predetermined point in the circuit of the invention.

Referring to FIG. 3, the combination of signals $w$ and $y$ to provide the output S is indicated by the group pulse envelope 58 along the time varying coordinate line designated by $t$. The carrier frequency is designated by the curve 59. The group delay pulse for the output signal C is designated by the line 60 and the carrier frequency signal by the sinusoidal line 61. It will be clearly evident from a study of this view that any particular point on the carrier waveform line 59 is 90° out-of-phase from line 61. Meanwhile, the group delay pulses are identical. Dotted lines 62 have been shown to indicate to the reader the point-to-point relationship of the carrier signals between outputs S and C.

Two outputs have now been generated by a single input signal and these signals may be used individually to reverse the polarities, vary the gain and generate a combined output signal having any desired characteristic.

In the second circuit of the embodiment of the invention 180° hybrids are used in the processing of generated signals S and C. Signal S forms the input signal of hybird 41 having variable mismatch load means 43 and 44 oriented 180° relative to one another. By adjusting the respective mismatch load it is also possible to vary the amplitude and polarity of the signal pulses as they pass through the 0 point. The vectors therefore may be combined to provide a third signal which is fed by means of line 45 to the final or summer hybird means 50.

Signal C is fed through line 40 to hybrid 42 having variable mismatches 46 and 47 on the sum and difference arms as indicated. Again, as in the case of hybrid 41, a variable amplitude signal is generated at the single output and fed by line 48 to the summing hybrid 50. Hybrid 50 resembles hybrids 33 and 38 in that two input signals furnish a single output. In this instance, however, the output signal is the sum of the two input signals while the difference signals are absorbed by the load 52. The total group delay of the output signals will be equivalent to approximately 135° phase shift at frequency $f_0$ while a carrier phase shift may be continuously variable through 360°. The amplitude is also variable. If desired a single knob control could be provided in the circuit to simply vary the phase through the 360° while maintaining a constant amplitude.

A working embodiment of the disclosed invention has been measured to discover the error versus frequency parameter of the circuit network and it was observed that over a 40 percent band-width, a maximum error of .1 db would be experienced.

It may be noted that the hybrid means including hybrid transformers are desirable in view of the requirement for the inversion of polarity in the combining of signals in the latter part of the circuit network. It may also be observed that resistive signal splitters as well as signal combiners may be utilized in the circuit to replace the hybrids 11, 17, 23 and 50 although such a substitution may result in slightly higher losses which may be tolerable in certain applications. In such a circuit attenuators 16 and 30 would have values of 21.54 db and 9.54 respectively.

Figure 4:
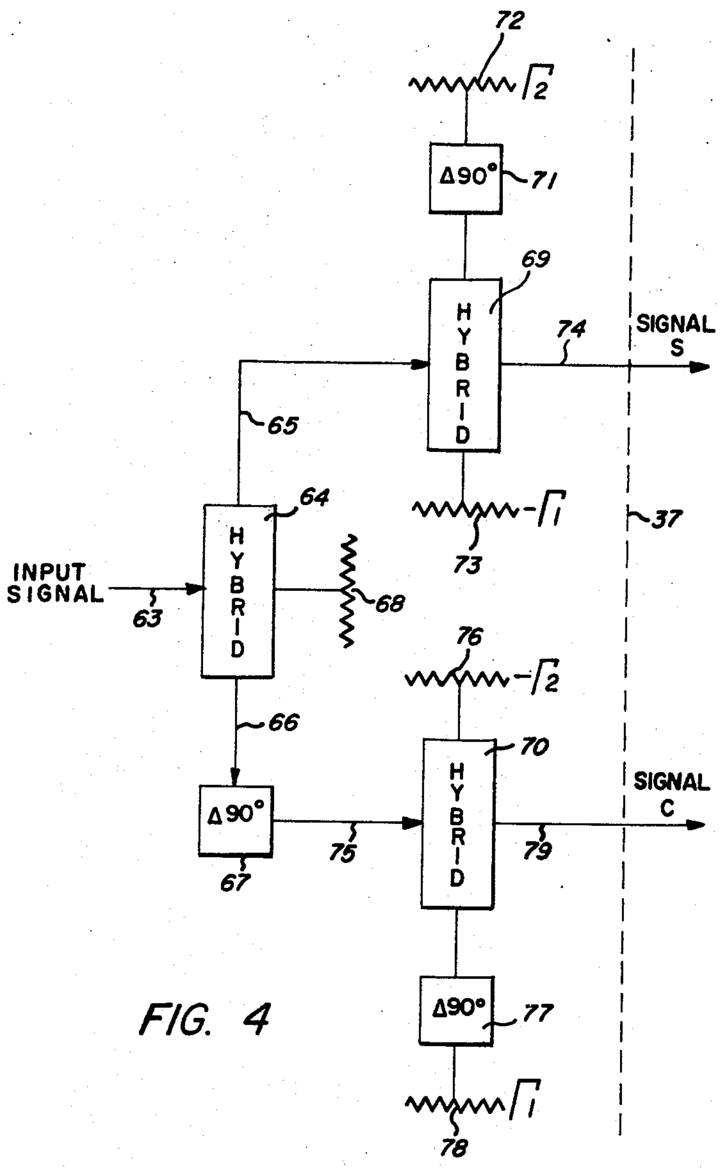
FIG. 4 is a schematic circuit diagram of an alternative embodiment of the invention.

Referring next to FIG. 4, an alternative embodiment of the invention is illustrated. Input signals conducted by means of line 63 are received by hybrid 64. Branch lines 65 and 66 are in phase with respect to one another and the injut signal is equally divided. One-half of the signal power is fed by a line to time delay means 67 of a sufficient length to provide the 90° phase shift desired. Reflected signals are partially absorbed by the dummy matched load 68 coupled to the fourth arm of the hybrid.

The delayed signal which will be 90° out-of-phase as well as the signal conducted along branch line 65 having no phase delay now are processed through hybrids 69 and 70 which both provide for a mismatch at the input thereby differing from the previously described hybird means in relation to FIG. 1 wherein a matched input is provided. The 180° oriented lines of hybrid 69 provide in the path of one-half of these signals a delay line means 71 and mismatch 72. The remaining one-half of the signals sees the mismatch 73. The reflection coefficients are adjusted to provide the proper weights on the components of the signals S and C. The output of the hybrid 69 is fed by line 74 to any desired circuitry for individual or combined processing similar to FIG. 1.

The delayed component of the input signal traverses line 75 to comprise the input signal of hybird 70 having the mismatches and delay line means oriented essentially as a mirror image of the previously described structure. Mismatch means 76 having a reflection coefficient ($-\Gamma_2$) influences one-half of the input signal and the time delay means 77 is oriented 180° from this mismatch together with an accompanying mismatch 78 having a reflection coefficient ($\gamma_1$). The output of hybird 70 will provide signal C and is fed along line 79 to the subsequent circuitry similarly to signal S.

A relatively simpler first circuit is thus disclosed in FIG. 4 which provides for an equalized output group delay together with a 90° phase difference in the carrier frequency signals. A fewer number of components are required, specifically, the class of sum and difference hybrids as well as the attenuator means which may result in some economies in the provision of the over-all phase shifter network.

This completes the description of the illustrative embodiment of the invention and it will be evident to those skilled in the art that any number of equivalent components may be substituted in modifying the embodiment. It is intended therefore that the foregoing description shall be considered as exemplary only and not in a limiting sense in the interpretation of the broader aspects of the invention.

What is claimed is:

1. A wideband radio frequency phase shifting transmission network comprising:

input signal pulse coupling means;

a plurality of signal power dividing means having single input and multiple output branch lines;

a plurality of time delay means providing a 90° phase shift at the center frequency of the transmission frequency band;

a plurality of sum and difference signal combiners of the 180° hybrid type having multiple input and single output branch lines;

and a plurality of attenuating means;

the first of said dividing means being connected to said input signal coupling means and having one of said time delay means connected to one branch line and one of said attenuating means connected to the other branch line and the input of the first of said hybrid combiners;

the second of said dividing means being serially connected to said delayed signal branch line with one output branch line serially connected to the second of said time delay means;

the other of said output branch lines being connected to the second of said hybrid combiners;

the third of said dividing means being serially connected to said last-mentioned delayed signal branch line and having one output branch line connected to the remaining input of said first hybrid combiner;

the other of said third dividing means output branch lines being connected to the third of said time delay means;

the remaining attenuating means being interconnected to the third delayed signal branch line and the remaining input of said second hybrid combiner;

said hybrid combiners providing in each of the output branch lines the difference in the respective dual signal pulses whereby two isolated output signal pulses are generated having substantially equal group delay and a 90° phase differential in the carrier signal frequencies.

2. A wide band radio frequency phase shifting transmission network according to claim 1 wherein all of said power dividing means are hybrid splitters of the 180° type.

3. A wideband radio frequency phase shifting transmission network according to claim 1 wherein said hybrid combiner means and power dividing means comprise hybrid transformers.

4. A wideband radio frequency phase shifting transmission network according to claim 1 wherein said hybrid combiner means and power dividing means have matched loads connected to the remaining output branch lines to provide for isolation of the output signal pulses.

5. A wideband radio frequency phase shifting transmission network comprising:

a first circuit including input signal pulse coupling means;

a plurality of signal power dividing means having single input and multiple output branch lines;

a plurality of time delay means providing a 90° phase shift at the center frequency of the transmission frequency band;

a pair of sum and difference signal combiners of the 180° hybrid type having multiple input and single output branch lines;

and a plurality of attenuating means;

the first of said dividing means being connected to said input signal coupling means and having one of said time delay means connected to one output branch line and one of said attenuating means connected to the other output branch line and the input of the first of said hybrid combiners;

the second of said dividing means being serially connected to said delayed signal branch line with one output branch line serially connected to the second of said time delay means;

the other of said output branch lines being connected to the second of said hybrid combiners;

the third of said dividing means being serially connected to said last-mentioned delayed signal branch line and having one output branch line connected to the remaining input of said first hybrid combiner;

the other of said third dividing means output branch lines being connected to the third of said time delay means;

the remaining attenuating means being interconnected to third delayed signal branch line and the remaining input of said second hybrid combiner;

said first circuit providing in each of the output branch lines from said hybrid combiners the difference in the respective dual input signal pulses whereby two isolated output signal pulses are generated having substantially equal group delay and a 90° phase differential in the carrier signal frequencies;

a second circuit including in series with the output branch lines of each of said hybrid combiners a sum and difference signal combiner of the 180° type with variable mismatch loads coupled to each sum and difference branch line to vary the amplitude and polarity of the respective signals;

and signal power combining means connected to the output branch lines of said hybrid combiners to generate a single variable amplitude phase shifted signal pulse.

6. A wideband radio frequency phase shifting transmission network comprising:

input signal pulse coupling means;

a plurality of signal power dividing means having single input and multiple output branch lines;

a plurality of time delay means providing a 90° phase shift at the center frequency of the transmission frequency band;

the first of said dividing means being connected to said input signal coupling means and having one of said time delay means connected to one output branch line;

said second and third signal dividing means each having connected to one output branch line one of said time delay means and mismatch means with the other output branch line being connected to further mismatch means;

the other output branch line of said first signal power dividing means being serially connected to the input line of said second signal power dividing means;

and the delayed signal branch line of said first signal power dividing means being connected to the input line of said third signal power dividing means;

the reflection coefficients of said mismatch means connected to said second and third signal power dividing means being adjusted to provide two isolated output signals of substantially equal group delay and 90° phase differential in the carrier signal frequencies.

References Cited

UNITED STATES PATENTS

| | | | |
|---|---|---|---|
| 3,323,080 | 5/1967 | Schwelb et al. | 333—11 |
| 3,419,823 | 12/1968 | Seidel | 333—11 |

HERMAN KARL SAALBACH, Primary Examiner

PAUL L. GENSLER, Assistant Examiner

U.S. Cl. X.R.

333—31